United States Patent [19]
Hayashi

[11] Patent Number: 5,684,479
[45] Date of Patent: Nov. 4, 1997

[54] COMMUNICATION DEVICE PERFORMING CODE CONVERSION BETWEEN BINARY DATA AND SERIAL DATA

[75] Inventor: Yasukazu Hayashi, Niwa-gun, Japan

[73] Assignee: Okuma Corporation, Aichi, Japan

[21] Appl. No.: 507,523

[22] Filed: Jul. 26, 1995

[30] Foreign Application Priority Data

Jul. 29, 1994 [JP] Japan .................................. 6-178377

[51] Int. Cl.$^6$ .................................................. H03M 7/20
[52] U.S. Cl. .................................. 341/102; 341/95
[58] Field of Search .......................... 341/58, 59, 95, 341/102

[56] References Cited

U.S. PATENT DOCUMENTS

| | | | |
|---|---|---|---|
| 4,020,282 | 4/1977 | Halpern | 341/58 |
| 4,216,460 | 8/1980 | Baldwin et al. | 371/57 |
| 4,517,552 | 5/1985 | Shirota et al. | 341/58 |
| 4,677,421 | 6/1987 | Taniyama | 341/58 |
| 5,025,256 | 6/1991 | Stevens | 341/59 |
| 5,387,911 | 2/1995 | Gleichert et al. | 341/95 |

*Primary Examiner*—Marc S. Hoff
*Attorney, Agent, or Firm*—Oliff & Berridge

[57] ABSTRACT

A communication device assuring reliable and effective data transfer. Receiving a signal from a transmit timing generator, a communication control circuit sequentially transfers block data in RAM to an encoder. In response to a control signal from the communication control circuit, the encoder outputs a communication control signal, which comprises 6 bits of 0 and 6 bits of 1 and is indicative of the start of communication data, converting 8-bit parallel data (received from the RAM) into a 12-bit code comprising 6 bits of 0 and 6 bits of 1, and outputting a communication control signal indicative of the end of the communication data. The signals from the encoder are outputted as a serial signal, (which is free from any DC component) from a shift register and a driver.

3 Claims, 5 Drawing Sheets

PATTERN ENCODED BY ENCODER

| COMMUNICATION CONTROL CODE AND BINARY DATA (LEFT LSB) | ENCODED DATA |
|---|---|
| SD | 0 1 1 1 1 1 0 0 0 0 0 1 |
| 0 0 0 0 0 0 0 0 | 1 1 0 1 0 0 1 1 0 1 0 0 |
| 1 0 0 0 0 0 0 0 | 1 0 1 1 0 0 1 1 0 1 0 0 |
| 0 1 0 0 0 0 0 0 | 0 1 1 1 0 0 1 1 0 1 0 0 |
| 1 1 0 0 0 0 0 0 | 1 1 0 0 1 0 1 1 0 1 0 0 |
| 0 0 1 0 0 0 0 0 | 0 1 1 0 1 0 1 1 0 1 0 0 |
| ≈ | ≈ |
| 0 0 1 1 1 1 1 1 | 0 0 1 1 0 1 0 0 1 0 1 1 |
| 1 0 1 1 1 1 1 1 | 1 0 0 0 1 1 0 0 1 0 1 1 |
| 0 1 1 1 1 1 1 1 | 0 1 0 0 1 1 0 0 1 0 1 1 |
| 1 1 1 1 1 1 1 1 | 0 0 1 0 1 1 0 0 1 0 1 1 |
| ED | 1 0 0 0 0 0 1 1 1 1 1 0 |

Fig. 4

ENCODING EVERY 4 BITS OF BINARY DATA

| BINARY DATA (LEFT LSB) | ENCODED 4-BIT DATA |
|---|---|
| 0 0 0 0 | 1 1 0 1 0 0 |
| 1 0 0 0 | 1 0 1 1 0 0 |
| 0 1 0 0 | 0 1 1 1 0 0 |
| 1 1 0 0 | 1 1 0 0 1 0 |
| 0 0 1 0 | 0 1 1 0 1 0 |
| 1 0 1 0 | 1 0 0 1 1 0 |
| 0 1 1 0 | 0 1 0 1 1 0 |
| 1 1 1 0 | 0 0 1 1 1 0 |
| 0 0 0 1 | 1 1 0 0 0 1 |
| 1 0 0 1 | 1 0 1 0 0 1 |
| 0 1 0 1 | 0 1 1 0 0 1 |
| 1 1 0 1 | 1 0 0 1 0 1 |
| 0 0 1 1 | 0 0 1 1 0 1 |
| 1 0 1 1 | 1 0 0 0 1 1 |
| 0 1 1 1 | 0 1 0 0 1 1 |
| 1 1 1 1 | 0 0 1 0 1 1 |

FRAME CONFIGURATION IN TOKEN PASSING RING SYSTEM

EXAMPLE OF COMMUNICATION CONTROL CODE ENCODED INTO DIFFERENTIAL MANCHESTER CODE

| COMMUNICATION CONTROL CODE AND BINARY DATA (LEFT LSB) | DIFFERENTIAL MANCHESTER CODE (WHEN A PREVIOUS BIT IS 0) |
|---|---|
| SD | 1 1 0 0 1 0 0 0 1 1 0 1 0 1 0 1 |
| 0 0 0 0 0 0 0 0 | 1 0 1 0 1 0 1 0 1 0 1 0 1 0 1 0 |
| 1 0 0 0 0 0 0 0 | 0 1 0 1 0 1 0 1 0 1 0 1 0 1 0 1 |
| 0 1 0 0 0 0 0 0 | 1 0 0 1 0 1 0 1 0 1 0 1 0 1 0 1 |
| 1 1 0 0 0 0 0 0 | 0 1 1 0 1 0 1 0 1 0 1 0 1 0 1 0 |
| 0 0 1 0 0 0 0 0 | 1 0 1 0 0 1 0 1 0 1 0 1 0 1 0 1 |
| 0 0 1 1 1 1 1 1 | 1 0 1 0 0 1 1 0 0 1 1 0 0 1 1 0 |
| 1 0 1 1 1 1 1 1 | 0 1 0 1 1 0 0 1 1 0 0 1 1 0 0 1 |
| 0 1 1 1 1 1 1 1 | 1 0 0 1 1 0 0 1 1 0 0 1 1 0 0 1 |
| 1 1 1 1 1 1 1 1 | 0 1 1 0 0 1 1 0 0 1 1 0 0 1 1 0 |
| ED | 1 1 0 0 0 1 1 1 0 0 0 1 0 1 0 1 |

Fig. 7 PRIOR ART

COMMUNICATION DEVICE PERFORMING CODE CONVERSION BETWEEN BINARY DATA AND SERIAL DATA

BACKGROUND OF THE INVENTION

1. Field of the Invention

This invention relates to a communication device, and more particularly to a communication device including an encoder which encodes block data into a serial signal for a transmitter or a decoder which decodes received serial data into block data for a receiver, thereby transferring data efficiently.

2. Description of the Related Art

When transmitting binary block data including a destination address and a frame check sequence (FCS) code for error detection (called "block data" hereinafter), a conventional communication device using a token passing ring system or the like generates a transfer frame assigning a starting delimiter SD, i.e. a communication control signal indicative of a start of transmission data, to the head of data frame D1 to FCS2, and an ending delimiter ED to an ending of the communication control signal. Refer to FIG. 6. Every 8 bits of the binary block data are decoded into a differential Manchester code, i.e. converted into 16-bit serial data as shown in FIG. 7.

At the time of reception, after the starting delimiter SD of a transfer frame is recognized, every 16 bits of serial data are encoded, using a table shown in FIG. 7, into 8-bit parallel data in the reverse manner to that at the time of transmission. When a destination address in the parallel data agrees with an address of the communication device, every 8-bits of parallel data are sequentially stored in a memory until the ending delimiter ED is detected. Otherwise, a received frame is again converted into serial data so as to relay communication. With the token passing ring system communication, communication signals such as an access control signal (AC) and a frame status signal (FS) are actually attached to the starting delimiter DS and the ending limiter ED. These signals are omitted here to simplify the description.

With the differential Manchester encoding system which converts data as shown in FIG. 7, the number of bits which are 0 and the number of bits which are 1 is the same throughout the frame. An output signal, which is transmitted as an electric signal by a driver or the like, is required to contain no DC component. In such a case, a transformer or the like may be used to provide isolation. Therefore, the differential Manchester encoding system is effective for improving resistance to noise, and is useful for communication of a control system which suffers from noise and should be performed without malfunction. Further, the differential Manchester encoding system is advantageous in the following respect. When a transmission signal is converted into an optical signal, it is resistant to noise, and is transmitted using an optical fiber. Further, the optical signal can be easily decoded into a binary code signal. This is because an average voltage of the optical signal has a threshold level after it is converted into an electric signal by the receiver, and this is true even when the optical signal is attenuated due to reduced mechanical precision of a connector or aging of light emitting and receiving elements.

The token passing ring system communication device uses communication control signals for the starting delimiter SD and the ending delimiter ED which are different from the serial data obtained by converting the binary data. Thus, this communication device assures reliable detection of the start and end of the transfer frame, and reliable transfer of data.

The foregoing communication device, in which 8-bit parallel data is converted into 16-bit serial data, is prone to a problem that it suffers from a reduced data transfer efficiency compared with a communication device of the asynchronous system. Since the asynchronous system communication device uses a signal containing a DC component, it cannot reliably detect the start and end of a frame. However, with the asynchronous system, the 8-bit binary code can be encoded into 11-bit serial data, which includes a control bit such as a parity check bit. The asynchronous system assures data transfer efficiency per baud rate of 73% ((8/11)*100) while the conventional communication device assures 50% transfer data efficiency ((8/16)*100).

SUMMARY OF THE INVENTION

The present invention is contemplated so as to overcome the foregoing problems of the prior art, and is aimed at providing a communication device which can reliably and efficiently transfer data.

According to the invention, there is provided a communication device for transmitting a frame generated by converting a block of binary data into serial data. The communication device comprises an encoder encoding every N bits of binary data, where (N≧4), into 2·M-bit serial data including M bits of 0 and M bits of 1, where M is (M<N, $2^{\wedge}N<(2M)!/(M!)^{\wedge}2$).

The encoder converts a communication control signal contained in the frame into 2·M-bit serial data including M bits of 0 and M bits of 1 and having a pattern different from a pattern of the converted binary data.

The encoder converts every 4 bits of the binary data into 6-bit serial data having 3 bits of 0 and 3 bits of 1.

The encoder encodes the binary data into data which does not have 3 or more consecutive bits of the same value at the start and end of a bit pattern.

The encoder converts every 8 bits of the binary data into 12-bit serial data having 6 bits of 0 and 6 bits of 1, and converts the communication control signal into a 12-bit code which includes 6 bits of 0 and 6 bits of 1, and has a pattern different from a pattern of the converted binary data.

To transmit a signal, an encoder encodes every N bits of binary data into 2·M-bit serial data including M bits of 0 and M bits of 1. In this case, N is ≧4, and M is (M<N, $2^{\wedge}N<(2M)!/(M!)^{\wedge}2$), where ^ denotes a power and ! denotes a factorial. The 2·M-bit serial data include the same number of 0's and 1's, and can be treated as a signal free from any DC component. The number of bit patterns composed of M 0's and M 1's is M—M combination, and can be expressed by formula (1), since 0's and 1's are combined.

$$(2M)!/(M!)^{\wedge}2 \tag{1}$$

When N is equal to or more than 4, N-bit binary data can be represented by a code having a unique pattern composed of the number M of 0's and the same number of 1's, where M is less than N. First of all, with M=N−1, the following is proved, on the basis of formula (1), $$\begin{aligned}(2M)!/(M!)2 &= (2N-2)!/\{(N-1)!\}2 = \\ &\{(2N-2) \cdot (2N-3) \ldots (N+1) \cdot N \cdot (N-1)!\}/\{(N-1)!\} 2 = \\ &\{(2N-2) \cdot (2N-3) \ldots (N+1) \cdot N\}/(N-1)! = \\ &\{(2N-2) \cdot (2N-3) \ldots (N+1) \cdot N\}/\{(N-1) \cdot (N-2) \ldots 1\} = \\ &(2N-2)/(N-1) \cdot (2N-3)/(N-2) \ldots (N+1)/2 \cdot N/1\end{aligned} \tag{2}$$

When rewriting the members which are divided on the right side of formula (2) as:

$$F(K)=(N+K-1)/K \ (1 \leq K \leq N-1, \text{ natural number}) \quad (3)$$

and substituting formula (3) for formula (2), we derive:

$$(2M)!/(M!)^2 = F(N-1) \cdot F(N-2) \ldots F(2) \cdot F \quad (4)$$

In this state, F(K) is a minimum of 2 when K=N−1. Thus, F(K) is always equal to or larger than 2. Further, N is equal to or larger than 4, and F(1) is equal to or larger than 4. Therefore, $$(2M)!/(M!)^2 > 2 \cdot 2 \ldots 2 \cdot 4 = 2^N \quad (5)$$

When N is equal to or larger than 4, there should be an M which can generate a number of bit patterns larger than 2 to the Nth power. Therefore, when N is equal to or larger than 4, N-bit binary data can be converted into a 2·M-bit unique code (serial data) containing M bits of 0 and M bits of 1, where M is smaller than N. This means that the communication device of the present invention can transfer data more efficiently, at a given baud rate, than a communication device using a differential Manchester code in which N-bit binary data is encoded into data having twice as many N bits (2N).

The foregoing formulas (1) to (5) are used to prove that N-bit (N≧4) binary data can be converted into a (2N−2)-bit code comprising the number N−1 of 0's and the number N−1 of 1's. Alternatively, in accordance with the number of bits of the binary data, N-bit binary data may be converted into a code comprising 0's and 1's which are smaller in quantity than the number N−1.

Since the code, except for the converted binary data, having a unique bit pattern and comprising M 0's and M 1's is used as a communication control signal, the start and end of the transfer frame can be reliably detected.

For signal reception, the decoder decodes received 2·M-bit serial data, comprising M bits of 0 and M bits of 1, into N-bit binary data. Thus, the communication device can efficiently receive transferred signals at a given baud rate. In this case, N and M are defined as described above with respect to the signal transmission.

BRIEF DESCRIPTION OF THE DRAWINGS

The invention will be described in greater detail with reference to the accompanying drawings, wherein:

FIG. 4 is a table used for code conversion by an encoder and a decoder in the embodiment of the invention;

FIG. 7 is a table used for code conversion in the conventional communication device.

DETAILED DESCRIPTION OF THE PREFERRED EMBODIMENT

Figure 1:
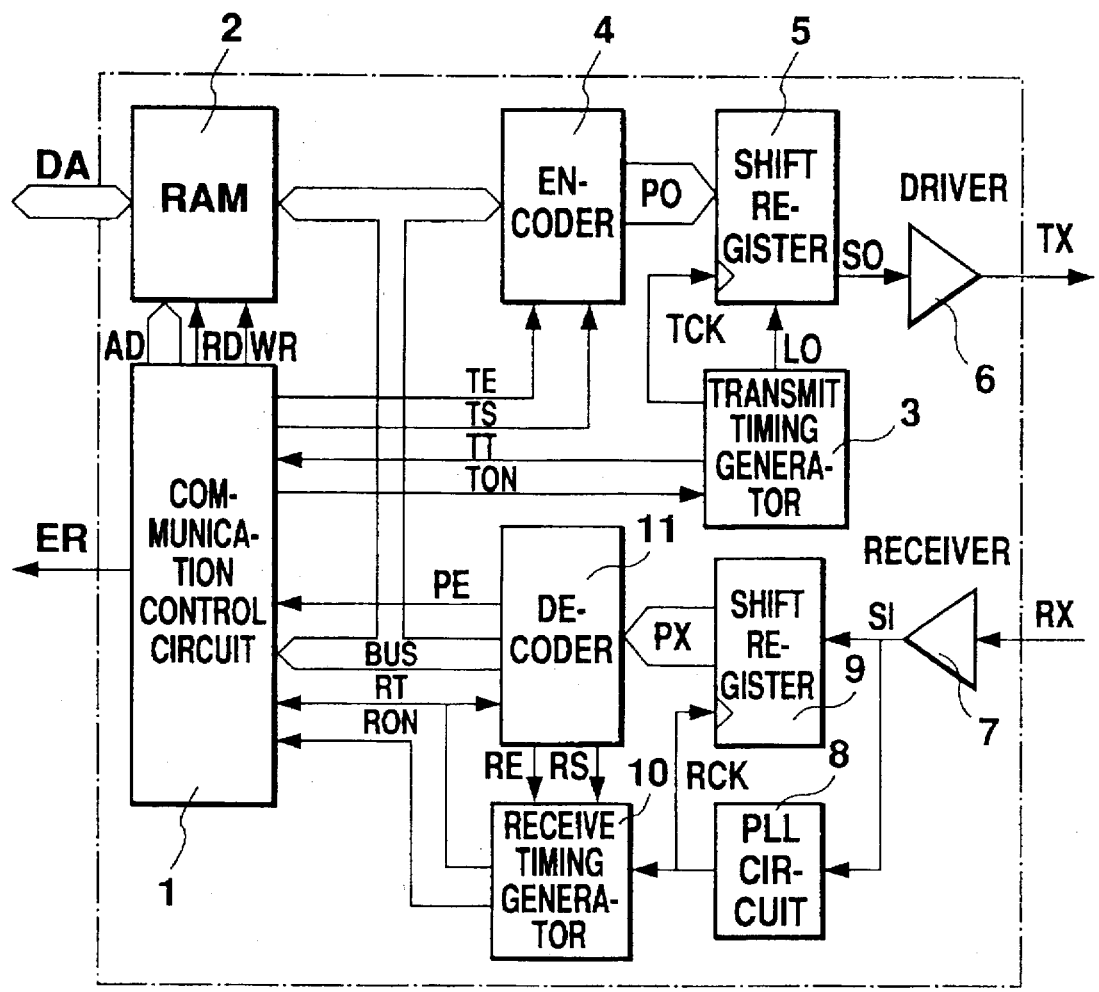
FIG. 1 is a block diagram showing the configuration of a communication device according to an embodiment of the invention.

Referring to FIG. 1, a communication device of the present invention comprises transmitting and receiving mechanisms, both of which are controlled by a communication control circuit 1. The transmitting mechanism includes a RAM 2 storing block data to be transmitted, a transmit timing generator 3 timing signal transmission, an encoder encoding the block data and generating a frame to be transmitted, a shift register 5 converting the frame (parallel data) generated by the encoder 4 into serial data, and a driver 6 transmitting the serial data.

The receiving mechanism includes a receiver 7 receiving the serial data, a PLL circuit 8 synchronizing reception, a shift register 9 converting the received serial data into parallel data, a receive timing generator 10 timing transfer of the received data, and a decoder 11 decoding a received frame.

Figure 2:
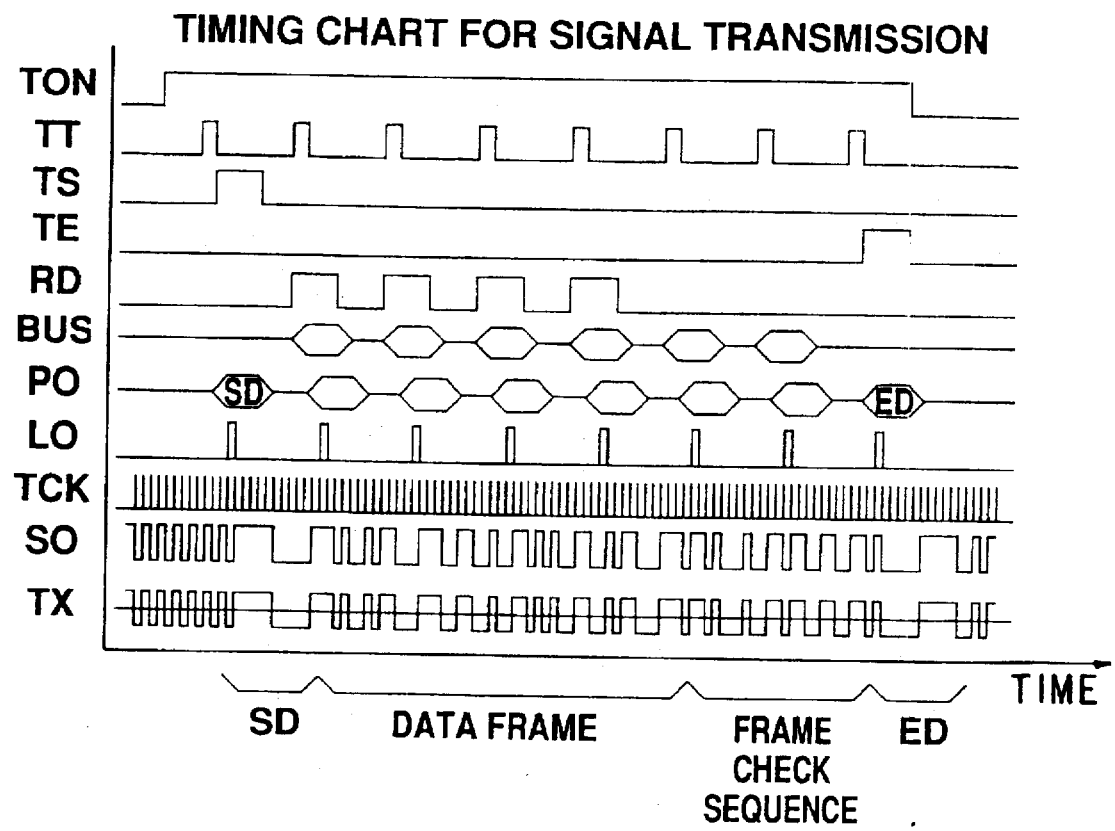
FIG. 2 is a timing chart of signal transmission.
Figure 3:
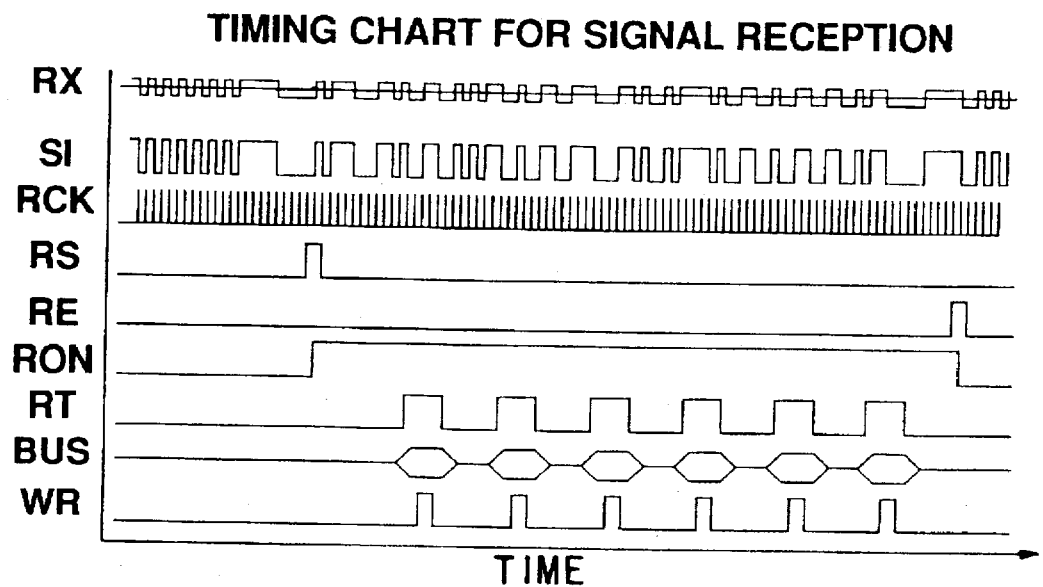
FIG. 3 is a timing chart of signal reception.

FIG. 2 is a timing chart of the communication device transmitting a signal. FIG. 3 shows the timing for the receiver 7 to receive a frame as a signal RX. The encoder 4 and the decoder 11 use the tables shown in FIGS. 4 and 5 at the time of data conversion.

This embodiment features that at the time of transmission, N-bit binary data is converted into a 2·M-bit unique serial data having M 0's and M 1's, where the N-bit binary data is expressed by N≧4, M<N, $2^N < (2M)!/(M!)^2$. During the reception, a received 2·M-bit serial data having M 0's and M 1's is converted into an N-bit binary data. This is effective in improving the data transfer rate.

Further, the unique bit pattern code including M 0's and M 1's, except for the code used by the received binary data, is used as a communication control signal, which allows reliable detection of the start and end of the transfer frame. Thus, the communication device can assure very reliable data transfer.

In operation, an 8-bit binary data block is transferred as described below. Each 8-bit binary data block is divided into two consecutive 4-bit data blocks, each of which is encoded into a 6-bit code. In this case, N is 4, and M is 3.

It is assumed that the communication device of FIG. 1 transfers a block of data, which contains a transfer address and so on written into the RAM 2 by a unit (not shown) connected to an external data bus DA. First of all, the communication control circuit 1 issues a transmit operation signal TON so as to actuate the transmit timing generator 3. Upon receiving a timing signal TT returned by the transmit timing generator 3, the communication control circuit 1 sends a signal TS to notify the encoder 4 of the start of transmission, and transmits an address signal AD and a read signal RD so as to sequentially transfer each 8-bit block data (stored in the RAM 2) to the encoder 4 via an internal data bus BUS. Thereafter, the transfer block data, obtained via the internal data bus BUS in response to the timing signal TT, is divided using a generator polynomial X16+X12+X5+1. Every 8 bits of the remaining 16 bits are transferred to the encoder 4 as frame check data. A signal TE is used to notify the encoder 4 of the end of data transfer.

Figures 5, 6:
FIG. 5 is a supplement to the table shown in FIG. 4.
FIG. 6 shows the configuration of a frame of a conventional token passing ring system communication device.

Receiving the signal TS indicative of the start of transmission, the encoder 4 generates a frame and outputs it. First of all, a 12-bit starting delimiter SD shown in FIG. 4 is outputted. Next, the encoder 4 encodes every 4 consecutive bits of 8-bit parallel data (from the RAM 2) or 8-bit frame check data (from the communication control circuit 1) into a code (encoded 4-bit data) as shown in FIG. 5. Every 4 bits of 8-bit parallel data are encoded into unique 6-bit data. The 6-bit data is coupled to form 12-bit data, which is made to correspond to the original 8-bit data. The table shown in FIG. 5 may be stored in the encoder 4 beforehand. When the signal TE indicates the end of transmission, the 12-bit ending delimiter ED is sent to the shift register 5. The shift register 5 converts the encoded 12-bit parallel data (from the encoder 4) into serial data SO in response to a serial clock signal TCK and a load signal LO from the timing generator 3. The driver 6 transmits the serial data SO as a signal TX (shown in FIG. 2) free from any DC component. Since the 8-bit data is encoded into the 12-bit data in this embodiment, data transfer efficiency for a given baud rate is 67% ((8/12)*100), which is good compared with 50% of the differential Manchester code.

As described, the 8-bit binary data is encoded into the 12-bit serial data containing 6 bits of 0 and 6 bits of 1 which are obtained by coupling 6-bit codes converted on the basis of every 4 bits of the 8-bit data.

In this embodiment, the 6-bit code made from 4-bit binary data not only includes the same number of 0's and 1's (i.e. 3 bits) but is also coded such that 3 or more bits of consecutive 0's or 1's do not exist at the start and the end of the bit pattern. Further, the communication control signals indicative of the start and the end of communication comprise 6 bits of 0 and 6 bits of 1, and the code includes 5 bits of consecutive 0's or 5 bits of consecutive 1"s, or both. Therefore, the data in which any 8-bit binary data except for the communication control signal is encoded into 12-bit codes does not have 6 or more bits of consecutive 1's or 0's, which enables the start and end of the data transfer to be reliably detected.

The 4-bit binary data are converted into the 6-bit code including 3 bits of 0 and 3 bits of 1, so it is possible to effectively detect one or more error bits in the converted code compared with when the parity bit is added. Further, when the error detection is executed using the generator polynomial X16+X12+X5+1, one or more error bits can be easily corrected using a simple circuit.

Further, with the embodiment, the 8-bit binary data is divided into two 4-bit data items, which are converted into 3 bits of 0 and 3 bits of 1. On the basis of formula (1), 3 bits of 0 and 3 bits of 1 can produce twenty kinds of codes (6!/(3!)^2). Except for the codes shown in the table of FIG. 5, there are four kinds of surplus codes, which are usable as the communication control signals.

The 8-bit binary data block is converted into two 4-bit data items in the foregoing description. Alternatively, every 8 bits of the data block may be converted into 12-bit serial data having 6 bits of 0 and 6 bits of 1. The communication control signal may comprise 6 bits of 0 and 6 bits of 1, which may be converted into a 12-bit pattern code, except for the converted binary data.

The decoder 11 decodes the code in a similar manner to that done by the encoder, 4 as will be described later.

The communication device receives a signal as follows. Receiving a signal RX as shown in FIG. 3, the receiver 7 converts the signal RX into a binary-coded serial signal SI, which is transmitted to the PLL circuit 8 and the shift register 9. The PLL circuit 8 provides a shift clock signal RCK, which is synchronous with the change of the serial signal SI, to the shift register 9 and the receive timing signal generator 10. The shift register 9 converts the serial signal SI into a 12-bit parallel signal PX in response to the shift clock signal RCK, and provides the signal PX to the decoder 11. The decoder 11 decodes the 12-bit data into 8-bit binary data based on the tables in FIGS. 4 and 5 in a manner reverse to the signal transmission. The decoder 11 latches the converted data in response to a signal RT from the receive timing generator 10, and outputs it to the internal data bus BUS. Detecting the starting delimiter SD, the decoder 11 provides the receive timing generator 10 with a signal RS. Receiving the signal RS, the receive timing generator 10 outputs a receive operation signal RON to the communication control circuit 1 so as to indicate the signal reception.

Then, the communication control circuit 1 reads the 8-bit binary data from the decoder 11 via the internal data bus BUS in response to the signal RT from the receive timing generator 10, and recognizes that a transfer address designates its own communication device. When the decoder 11 receives the ending delimiter ED, the communication control circuit 1 sends the signal RE to the receive timing generator 10, and keeps sending an address signal AD and a write signal WR in response to the signal RT from the receive timing generator 10 until the receive timing generator 10 issues the signal RON indicative of the end of signal reception. The communication control circuit 1 writes the 8-bit binary data block in the RAM 2 (decoded by the decoder 11). On receiving the signal RON from the receive timing generator 10, the communication control circuit 1 checks whether the remainder, which is obtained by dividing the received data block using the generator polynomial X16+X12+X5+1, is zero, thereby confirming that the transfer data is free from errors.

Conversely, when the destination address is found to be incorrect, or when an abnormal pattern signal PE, which is issued if any of six bits in the 12-bit parallel signal PX, except for the communication control signal, denote data which is not shown in the table of FIG. 5, the communication control circuit 1 output an error signal ER to an external system.

With the present invention, it is possible to reliably detect the start and the end of the transfer frame using the communication control signal which differ from the binary data and have unique bit patterns. Thus, the communication device can offer reliable and efficient data transfer. For the signal transmission and reception, the binary data are converted into codes which can meet the foregoing requirements.

What is claimed is:

1. A communication device for transmitting a frame generated by converting a block of binary data into serial data, said communication device comprising an encoder encoding every N bits of binary data, where (N≧4), into 2·M-bit serial data including M bits of 0 and M bits of 1, wherein M is (M<N, 2^N<(2M)!/(M!)^2);

wherein the encoder converts every 4 bits of the binary data into 6-bit serial data having 3 bits of 0 and 3 bits of 1, and the serial data does not have 3 or more consecutive bits of the same value at the start and end of a bit pattern.

2. A communication device for transmitting a frame generated by converting a block of binary data into serial data, said communication device comprising an encoder encoding every N bits of binary data, where (N≧4, into 2·M-bit serial data including M bits of 0 and M bits of 1, where M is (M<N, 2^N<(2M)!/(M!)^2);

wherein the encoder converts a communication control signal contained in the frame into 2·M-bit serial data which includes M bits of 0 and M bits of 1 and has a pattern different from a pattern of the converted binary data, and the encoder further converts every 8 bits of the binary data into 12-bit serial data having 6 bits of 0 and 6 bits of 1, and converts the communication control signal into a 12-bit code which includes 6 bits of 0 and 6 bits of 1, and has a pattern different from a pattern of the converted binary data.

3. The communication device as in claim 2, wherein the encoder encodes binary data as a communication signal into a code having 5 or more consecutive bits of the same value.

* * * * *